United States Patent [19]
de Montigny et al.

[11] Patent Number: 5,977,279
[45] Date of Patent: Nov. 2, 1999

[54] ORGANOPOLYSILOXANE MIXTURE FOR THE PREPARATION OF ADHESIVE-REPELLENT ORGANOPOLYSILOXANE FILMS

[75] Inventors: Armand de Montigny, Leverkusen; Hans-Horst Steinbach, Lindlar; Udo Herrmann, Dormagen, all of Germany

[73] Assignee: GE Bayer Silicones GmbH & Co. KG, Erkrath, Germany

[21] Appl. No.: 08/293,001

[22] Filed: Aug. 19, 1994

[30] Foreign Application Priority Data

Aug. 26, 1993 [DE] Germany ............... 43 28 657

[51] Int. Cl.⁶ ............... C08L 83/07; C08L 83/05
[52] U.S. Cl. ............... 528/15; 525/478
[58] Field of Search ............... 528/15, 478

[56] References Cited

U.S. PATENT DOCUMENTS

| | | | |
|---|---|---|---|
| 4,772,515 | 9/1988 | Hara et al. | 428/447 |
| 5,077,369 | 12/1991 | De Montigny et al. | 528/15 |
| 5,563,203 | 10/1996 | Yoshino et al. | 525/478 |
| 5,616,672 | 4/1997 | O'Brien et al. | 528/15 |

FOREIGN PATENT DOCUMENTS

| | | |
|---|---|---|
| 051384 | 5/1982 | European Pat. Off. . |
| 069451 | 1/1983 | European Pat. Off. . |
| 403890 | 12/1990 | European Pat. Off. . |
| 549971 | 7/1993 | European Pat. Off. . |
| 559575 | 9/1993 | European Pat. Off. . |

OTHER PUBLICATIONS

W. Noll "Chemistry and Technology of Silicones", pp. 601–603, Academic Press, New York (1968).

*Primary Examiner*—Donald R. Wilson
*Attorney, Agent, or Firm*—Sprung Kramer Schaefer & Briscoe

[57] ABSTRACT

An organopolysiloxane composition that can be crosslinked by addition, comprising a) a branched organopolysiloxane having unsaturated hydrocarbon groups, and triorganosiloxy end units wherein at least 90% of the organo groups are methyl groups, the number average molecular weight of which is on average from 9,000 to 60,000, wherein the ratio of the number of diorganosiloxy units (D-units) to the number of branch points is on average between 15 and 40, and wherein at least one triorganosiloxy unit (M-unit) and at maximum half of all the M-units are free of unsaturated radicals, the remaining M-units each have only one unsaturated radical and the content of unsaturated radicals is from 0.2 to 1 mmol/g and b) a linear hydrogenpolysilxoane, wherein the number of siloxy units per molecule is greater than the ratio of the number of D-units to the number of branch points of component a), wherein at least half of the difunctional siloxy units (D-units) have hydrogen atoms directly bonded to silicon, and wherein the components a) and b) are present in a relative proportion such that the ratio of the number of SiH groups of component b) to the number of unsaturated hydrocarbon atoms of component a) is between 1.5 and 3.5, and c) a catalyzing quantity of a platinum catalyst, thereby a single composition can be used to coat a variety of substances without need for changing the reservoir containing the coating composition.

10 Claims, No Drawings

ORGANOPOLYSILOXANE MIXTURE FOR THE PREPARATION OF ADHESIVE-REPELLENT ORGANOPOLYSILOXANE FILMS

The present invention relates to a material for the adhesion-reducing finishing of thin-layered substrates. It is known that the surfaces of paper or other substrates can be coated with organopolysiloxanes in order to prevent adhesive substances from attaching to these surfaces (see, for example, W. Noll, "Chemie und Technologie der Silicone", Weinheim, 1968, pages 520–521). U.S. Pat. No. 4,772,515 discloses systems that cross-link by addition, wherein the components, which have unsaturated organyl groups, possess at least two branch points and at least every terminal Si atom has at least one unsaturated group.

Increasingly high demands are being made on methods for preparing polysiloxane coatings that repel adhesive substances as well as on the materials forming the basis of these methods. Methods and materials are required that are capable of coating all possible substrates perfectly, irrespective of the chemical and physical nature of their surfaces.

The classical silicon coating agents have been pushed to the limits of their capabilities owing to the recently greatly increased range between substrates with extremely smooth and extremely rough surfaces. For example, this has the result that coating systems which due to their structural composition provide perfect films on coated papers however fail in the coating of extremely smooth papers. When greater stress is applied to their surfaces, large rubbed-off parts appear and this cannot be avoided either by longer curing times or by higher curing temperatures. Conversely, systems which provide perfect results with extremely smooth papers fail to coat very highly coated papers. Consequently the range of modern papers can be bridged more or less satisfactorily only by using several coating agents, each with a different structural formula.

Thus the object of EP-A 403,890 was to find a coating agent that is suitable both for coating perfectly, without rubbed-off parts, extremely smooth (including synthetic) surfaces and very highly coated or similar surfaces. The advantage of such a system is stated to be that during industrial coating it is unnecessary to change the coating agent in the reservoir of the coating machine when changing the paper type.

The coating agents for paper according to EP-A 403,890 are distinguished from the commonly used structures by being branched and by having, for example, in addition to triorganosiloxy units with unsaturated groups, triorganosiloxy units that are free of such groups.

In the course of further developments in the field of silicon coatings for papers, there arose a desire for systems that could be cured even more rapidly in order fully to exploit machine capacities. Moreover, this more rapid curing should take place not only at the usual curing temperatures but also at considerably lower temperatures in the 100° C. range, so that heat-sensitive papers and substrates could also be coated economically.

The problem is solved by the subject matter of the present invention.

The present invention provides mixtures of organopolysiloxanes that can be cross-linked by addition consisting of a) a branched organopolysiloxane having unsaturated hydrocarbon groups,
   wherein at least 90% of the organo groups are methyl groups,
   the number average molecular weight of which is from 9,000 to 60,000,
   wherein the ratio of the number of diorganosiloxy units (D-units) to the number of branch points is on average between 15 and 40, and wherein at least one triorganosiloxy unit (M-unit) and at maximum half of all the M-units are free of unsaturated radicals, the remaining M-units each have only one unsaturated radical and the content of unsaturated radicals is from 0.2 to 1 mmol/g, and b) a linear methylhydrogenpolysiloxane,
   wherein the number of siloxy units per mole is greater than the ratio of the number of D-units to the number of branch points of component a),
   wherein at least half of the difunctional siloxy units (D-units) have hydrogen atoms directly bonded to silicon, and
   wherein the components a) and b) are present in a relative proportion such that the ratio of the number of SiH groups of component b) to the number of unsaturated hydrocarbon atoms of component a) is between 1.5 and 3.5, and c) an effective quantity of a platinum catalyst,
and optionally in addition d) usual auxiliary substances and additives, not taking part directly in the polyaddition reaction, in quantities of less than 5% by weight related to the overall mixture.

Preferably component a) has at least 12 T-units per molecule.

The organopolysiloxane mixtures according to the invention have very high rates of cross-linking so that high conveyor speeds can be achieved, particularly in the mechanical coating of paper where the paper is drawn off rolls, drawn through a coating device and then through a device for heat treatment.

An attempt to explain the high rate of cross-linking according to the invention is based on the assumption that it is due to linear methylhydrogenpolysiloxanes which are very long compared with the linear sections of the branched polyorganosiloxanes having unsaturated hydrocarbon groups. The methylhydrogenpolysiloxanes make available SiH-groups as cross-linking partners over virtually their entire length, whereas the branched organopolysiloxanes provide as cross-linking agents only unsaturated hydrocarbon groups on the end groups. Owing to the fact that the length of the methylhydrogenpolysiloxane greatly exceeds the length of the linear sections of the branched organopolysiloxanes, one methylhydrogenpolysiloxane molecule finds several terminal reaction groups on the same branched organopolysiloxane molecule as well as on other branched organopolysiloxane molecules, without the requirement for time-consuming molecular mobility in the mixture which has yet to be cross-linked. The linear sections of the branched organopolysiloxanes have an average number of D-units amounting to approximately half of the ratio of the number of diorganosiloxy units in total per molecule to the number of branch points per molecule, i.e. approximately between 7 and 20. The length of the linear methylhydrogenpolysiloxane is determined, according to the invention, by approximately at least double the number of organosiloxy groups per molecule.

The end groups of the branched organopolysiloxane, which are free of unsaturated radicals, fulfil the function of an internal softener. The flexibility of the cross-linked film can be controlled by the number of end groups (M-units) which are free of unsaturated radicals.

90% of the organo groups of the branched organopolysiloxane should consist of methyl groups. The organo groups remaining after taking into account the terminal unsaturated organo groups may consist of $C_1$- to $C_{14}$-alkyl groups, cycloalkyl groups or optionally alkyl-substituted phenyl groups. Moreover, a small number of non-terminal alkenyl groups is also permissible. The adhesive-repellent properties of the coatings produced with the organopolysiloxane mixtures according to the invention are affected by the selection of these remaining organo groups. Larger organo groups lead, however, to a reduction in the molecular mobility in the mixture that is still to be cross-linked and consequently to a reduction in the rate of cross-linking. Hence according to the invention all the organo groups with the exception of the terminal unsaturated radicals should preferably be methyl groups. The unsaturated hydrocarbon radicals of component a) may be $C_2$- to $C_8$-alkenyl groups which may also be interrupted by oxygen, such as, for example, $-CH=CHCH_2OCH_2CH=CH_2$. Preferably vinyl groups or allyl groups, more preferably vinyl groups, are used.

Monoorganosiloxy units, i.e. trifunctional siloxy units (T-units) are preferably used as branch points of component a). These may also be partly substituted by tetrafunctional siloxy units ($SiO_{4/2}$-units, Q-units). Here, according to the invention, one Q-unit is to be counted as a double branch point, i.e. as two T-units. Preferably no more than half of the branch points should consist of Q-units, i.e. the ratio of the number of T-units to the number of Q-units should be at least 2.

The linear methylhydrogenpolysiloxanes (component b) preferably have trimethylsiloxy end groups. At least half of the D-units should have hydrogen atoms bonded directly to silicon ($H(CH_3)SiO$-groups). The number of groups having hydrogen atoms bonded directly to silicon is preferably between 70 and 85% of the D-units. The number of siloxy units per molecule should moreover preferably not exceed double the ratio of the number of D-units to the number of branch points of component a). Linear methylhydrogenpolysiloxanes with a larger number of siloxy units preferably have a smaller relative number of D-units with hydrogen atoms directly bonded to silicon so that, at a given ratio of the number of SiH-groups to the number of unsaturated hydrocarbon groups in the mixture, the rate of cross-linking is not reduced by too low a number of methylhydrogenpolysiloxane molecules as compared with the number of branched organopolysiloxane molecules.

Examples of the structures of polysiloxane mixtures that fulfil the above conditions are as follows.

$[CH_2=CH(CH_3)_2SiO_{1/2}]_5[(CH_3)_3SiO_{1/2}]_2[(CH_3)_2SiO]_{200}[CH_3SiO_{3/2}]_5$ and $[(CH_3)_3SiO_{1/2}]_2[(CH_3)HSiO]_{30}[(CH_3)_2SiO]_9$ or $[CH_2=CH(CH_3)_2SiO_{1/2}]_5[(CH_3)_3SiO_{1/2}]_4[CH_2=CH(CH_3)SiO]_1[(CH_3)_2SiO]_{280}[CH_3SiO_{3/2}]_7$ and $[(CH_3)_3SiO_{1/2}]_2[(CH_3)HSiO]_{33}[(CH_3)_2SiO]_9$ and $[(CH_3)_3SiO_{1/2}]_7[CH_2=CH(CH_3)SiO]_2[CH_2=CH(CH_3)_2SiO_{1/2}]_4[(CH_3)_2SiO]_{133\ldots358}[CH_2=CHSiO_{3/2}]_3[CH_3SiO_{3/2}]_6$ or $[(CH_3)_3SiO_{1/2}]_3[CH_2=CH(CH_3)_2SiO_{1/2}]_7[(CH_3)_2SiO]_{120\ldots320}[(CH_3SiO_{3/2}]_4[SiO_2]_2$, each with appropriately selected methylhydrogensiloxanes.

Polymers of the above composition can be prepared according to the usual methods familiar to the person skilled in the art, for example, by hydrolysis of chlorosilanes and subsequent polymerization with low molecular cyclic diorganopolysiloxanes.

Auxiliary substances and additives can be modifiers, complexing agents for the catalyst, or solvents.

The advantage of the above compositions is that these materials can be used without objection equally on smooth papers as on rough, for example, highly coated papers. At the same time—in cases where high cross-linking temperatures are to be avoided—endlessly long cross-linking times do not have to be accepted. This has the result that, owing to the universal applicability, only standard methods are required in industrial siliconization, which makes possible the so-called continuous change of paper types.

The present invention also provides the use of the mixture according to the invention for adhesive-repellent coatings for substrates, in particular paper.

The application of the above mixtures takes place by the usual methods, for example, by dipping, rolling, spraying, coating, pouring, etc. Hardening takes place preferably between 90 and 200° C.

The following examples are intended to further illustrate the method according to the invention without however limiting it.

EXAMPLES 1–8

The following mixtures were prepared.

Example 1

12 parts by weight of a vinyl polymer of the composition
$[CH_2=CH(CH_3)_2SiO_{1/2}]_7[(CH_3)_3SiO_{1/2}]_3[(CH_3)_2SiO]_{250}[CH_3SiO_{3/2}]_8$ 1.6 parts by weight of a platinum complex solution in the above polymer with a platinum content of 440 ppm 0.85 parts by weight of a cross-linking agent of the composition
$[(CH_3)_3SiO_{1/2}]_2[(CH_3)HSiO]_{30}[(CH_3)_2SiO]_9$.

Example 2

12 parts by weight of a vinyl polymer of the composition
$[CH_2=CH(CH_3)_2SiO_{1/2}]_7[(CH_3)_3SiO_{1/2}]_3[(CH_3)_2SiO]_{250}[CH_3SiO_{3/2}]_8$ 1.1 parts by weight of a platinum complex solution in the above polymer with a platinum content of 1320 ppm 0.85 parts by weight of a cross-linking agent of the composition
$[(CH_3)_3SiO_{1/2}]_2[(CH_3)HSiO]_{30}[(CH_3)_2SiO]_9$.

Example 3

12 parts by weight of a vinyl polymer of the composition
$[CH_2=CH(CH_3)_2SiO_{1/2}]_7[(CH_3)_3SiO_{1/2}]_7[(CH_3)_2SiO]_{320}[CH_3SiO_{3/2}]_{12}$ 1.6 parts by weight of a platinum complex solution in the above polymer with a platinum content of 440 ppm 0.85 parts by weight of a cross-linking agent of the composition
$[(CH_3)_3SiO_{1/2}]_2[(CH_3)HSiO]_{30}[(CH_3)_2SiO]_9$.

Example 4

12 parts by weight of a vinyl polymer of the composition
$[CH_2=CH(CH_3)_2SiO_{1/2}]_7[(CH_3)_3SiO_{1/2}]_7[(CH_3)_2SiO]_{320}[CH_3SiO_{3/2}]_{12}$ 1.1 parts by weight of a platinum complex solution in the above polymer with a platinum content of 1320 ppm 0.85 parts by weight of a cross-linking agent of the composition
$[(CH_3)_3SiO_{1/2}]_2[(CH_3)HSiO]_{30}[(CH_3)_2SiO]_9$.

Example 5 (Comparison)

12 parts by weight of a vinyl polymer of the composition
$[CH_2=CH(CH_3)SiO]_6[(CH_3)_3SiO_{1/2}]_2[(CH_3)_2SiO]_{220}$ 0.5 parts by weight of a platinum complex solution in the above polymer with a platinum content of 1320 ppm 1.1 parts by weight of a cross-linking agent of the composition $[(CH_3)_3SiO_{1/2}]_2[(CH_3)HSiO]_{30}[(CH_3)_2SiO]_9$.

Example 6 (Comparison)

12 parts by weight of a vinyl polymer of the composition
$[CH_2=CH(CH_3)SiO]_6[(CH_3)_3SiO_{1/2}]_2[(CH_3)_2SiO]_{220}$ 1.0 part by weight of a platinum complex solution in the above polymer with a platinum content of 1320 ppm 1.15 parts by weight of a cross-linking agent of the composition $[(CH_3)_3SiO_{1/2}]_2[(CH_3)HSiO]_{30}[(CH_3)_2SiO]_9$.

Example 7 (Comparison analogous to Example 2 of EP-A 403.890)

12 parts by weight of a vinyl polymer of the composition
$[CH_2=CH(CH_3)_2SiO_{1/2}]_3[(CH_3)_3SiO_{1/2}]_3[(CH_3)_2SiO]_{250}[CH_3SiO_{3/2}]_4$ 1.6 parts by weight of a platinum complex solution in the above polymer with a platinum content of 440 ppm 0.5 parts by weight of a cross-linking agent of the composition $[(CH_3)_3SiO_{1/2}]_2[(CH_3)HSiO]_{30}[(CH_3)_2SiO]_9$.

Example 8 (Comparison analogous to Example 2 of EP-A 403.890)

12 parts by weight of a vinyl polymer of the composition
$[CH_2=CH(CH_3)_2SiO_{1/2}]_3[(CH_3)_3SiO_{1/2}]_3[(CH_3)_2SiO]_{250}[CH_3SiO_{3/2}]_4$ 1.1 parts by weight of a platinum complex solution in the above polymer with a platinum content of 1320 ppm 0.5 parts by weight of a cross-linking agent of the composition $[(CH_3)_3SiO_{1/2}]_2[(CH_3)HSiO]_{30}[(CH_3)_2SiO]_9$.

CURING TESTS

Examples 1A–8A

Laboratory tests:

The mixtures according to Examples 1 to 8 were applied with a laboratory doctor blade to smooth calendered paper from various sources. The thickness of the film was 2 μm. The papers remained in a contact reactor at 90° C. and cured until they were "rub-off"-free. These times are shown in the following table as $t_{min}$.

Examples 1B–8B

Mechanical tests

The mechanical tests were carried out on a modern machine at 3 temperatures, with the speeds ($V_{max}$) for each example (mixtures according to Examples 1 to 8) respectively being determined at which no "rub-off" occurred at the temperatures concerned. For mechanical technical reasons tests over 300 m/min could not be carried out at the time of the tests.

The results are shown in Table 1. The maximum possible machine conveyor speed of 300 m/min was achieved respectively at the lowest temperature of 110° C. and the lowest content of catalyst of 50 ppm. It is believed that considerably higher machine speeds are attainable at cross-linking temperatures of 160° C.

TABLE 1

| | A | | B | | |
|---|---|---|---|---|---|
| Example | Contact reactor [°C.] | $t_{min}$ [sec] | Machine [°C.] | Machine [$V_{max}$] | Pt [ppm] |
| 1 | 90 | 13 | 160 | 300 m/min | 50 |
|   |    |    | 120 | 300 |    |
|   |    |    | 110 | 300 |    |
| 2 | 90 | 9  | 160 | 300 | 100 |
|   |    |    | 120 | 300 |    |
|   |    |    | 110 | 300 |    |
| 3 | 90 | 13 | not tested | | 50 |
| 4 | 90 | 10 | not tested | | 100 |
| 5 (Comp.) | 90 | 15 | 160 | 240 | 50 |
|   |    |    | 120 | *) |    |
|   |    |    | 110 | *) |    |
| 6 (Comp.) | 90 | 11 | 160 | 240 | 100 |
|   |    |    | 120 | 150 |    |
|   |    |    | 110 | *) |    |
| 7 (Comp.) | 90 | 19 | 160 | 150 | 50 |
|   |    |    | 120 | *) |    |
|   |    |    | 110 | *) |    |
| 8 (Comp.) | 90 | 11 | 160 | 200 | 100 |
|   |    |    | 120 | *) |    |
|   |    |    | 110 | *) |    |

*) $V_{max}$ was not determined, because it was no longer economically justifiable (less than 150 m/min).

It will be understood that the specification and examples are illustrative but not limitative of the present invention and that other embodiments within the spirit and scope of the invention will suggest themselves to those skilled in the art.

We claim:

1. An organopolysiloxane composition that can be cross-linked by addition, comprising
   a) a branched organopolysiloxane having unsaturated hydrocarbon groups and triorganosiloxy end units,
   wherein at least 90% of the organo groups are methyl groups,
   the number average molecular weight of which is from 9,000 to 60,000,
   wherein the ratio of the number of diorganosiloxy units (D-units) to the number of branch points is on average between 15 and 40, and
   wherein the least one triorganosiloxy unit (M-unit) and at maximum half of all the M-units are free of unsaturated radicals, the remaining M-units each have only one unsaturated radical and the content of unsaturated radicals is from 0.2 to 1 mmol/g and
   b) a linear hydrogen polysiloxane,
   wherein the number of siloxy units per molecule is greater than the ratio of the number of D-units to the number of branch points of component a),
   wherein at least half of the difunctional siloxy units (D-units) have hydrogen atoms directly bonded to silicon, and
   wherein the components a) and b) are present in a relative proportion such that the ratio of the number of SiH groups of component b) to the number of unsaturated hydrocarbon groups of component a) is between 1.5 and 3.5, and
   c) a catalyzing quantity of a platinum catalyst.

2. A composition according to claim 1, wherein the branch points of component a) comprises trifunctional monoorganosiloxy units (T-units) up to one half of which are optionally substituted by tetra-functional siloxy groups (Q-units), wherein the determination of the ratio of branch points to D-units each Q-unit is counted as 2 branch points.

3. A composition according to claim 1, wherein the unsaturated hydrocarbon groups of component a) are $C_2$- to $C_8$ alkenyl groups.

4. A composition according to claim 1, wherein the number of organosiloxy groups of component b) is at most double the ratio of the number of D-units to the number of branch points of component a).

5. A composition according to claim 1, wherein component a) has at least 12 T-units per molecule.

6. A composition according to claim 1, containing up to about 5% by weight of complexing agents for the catalyst, or solvents.

7. A composition according to claim 1, comprising approximately 12 parts by weight of $[CH_2=CH(CH_3)_2SiO_{1/2}]_7[(CH_3)_3SiO_{1/2}]_3[(CH_3)_2SiO]_{250}[CH_3SiO_{3/2}]_8$, 1.6 parts by weight of a platinum complex solution in the above polymer with a platinum content of 440 ppm, and 0.85 parts by weight of a cross-linking agent of the composition $[(CH_3)_3SiO_{1/2}]_2[(CH_3)HSiO]_{30}[(CH_3)_2SiO]_9$.

8. A composition according to claim 1, comprising approximately 12 parts by weight of $[CH_2=CH(CH_3)_2SiO_{1/2}]_7[(CH_3)_3SiO_{1/2}]_3[(CH_3)_2SiO)]_{250}[CH_3SiO_{3/2}]_8$, 1.1 parts by weight of a platinum complex solution in the above polymer with a platinum content of 1320 ppm, and 0.85 parts by weight of a cross-linking agent of the composition $[(CH_3)_3SiO_{1/2}]_2[(CH_3)HSiO]_{30}[(CH_3)SiO]_9$.

9. A composition according to claim 1, comprising approximately 12 parts by weight of $[CH_2=CH(CH_3)_2SiO_{1/2}]_7[(CH_3)_3SiO_{1/2}]_7[(CH_3)_2SiO]_{320}[CH_3SiO_{3/2}]_{12}$, 1.6 parts by weight of a platinum complex solution in the above polymer with a platinum of 440 ppm, and 0.85 parts weight of a cross-linking agent of the composition $[(CH_3)_3SiO_{1/2}]_2[(CH_3)HSiO]_{30}[(CH_3)_3SiO]_9$.

10. A composition according to claim 1, comprising approximately 12 parts by weight of $[CH_2=CH(CH_3)SiO_{1/2}]_7[(CH_3)_3SiO_{1/2}]_7[(CH_3)_2SiO]_{320}[CH_3SiO_{3/2}]_{12}$, 1.1 parts by weight of a platinum complex solution in the above polymer with a platinum content of 1320 ppm, and 0.65 parts by weight of a cross-linking agent of the composition $[(CH_3)_3SiO_{1/2}]_2[(CH_3)HSiO]_{30}[(CH_3)_2SiO]_9$.

* * * * *